United States Patent
Porzio et al.

(10) Patent No.: US 12,032,836 B2
(45) Date of Patent: Jul. 9, 2024

(54) POWER MANAGEMENT TECHNIQUES

(71) Applicant: Micron Technology, Inc., Boise, ID (US)

(72) Inventors: Luca Porzio, Casalnuovo (IT); Paolo Papa, Naples (IT); Crescenzo Attanasio, Acerra (IT)

(73) Assignee: Micron Technology, Inc., Boise, ID (US)

( * ) Notice: Subject to any disclaimer, the term of this patent is extended or adjusted under 35 U.S.C. 154(b) by 221 days.

(21) Appl. No.: 17/397,733

(22) Filed: Aug. 9, 2021

(65) Prior Publication Data

US 2023/0041215 A1 Feb. 9, 2023

(51) Int. Cl.
*G06F 3/06* (2006.01)
*G06F 12/0804* (2016.01)
*G06F 12/10* (2016.01)

(52) U.S. Cl.
CPC .......... *G06F 3/0625* (2013.01); *G06F 3/0634* (2013.01); *G06F 3/0659* (2013.01); *G06F 3/0679* (2013.01); *G06F 12/0804* (2013.01); *G06F 12/10* (2013.01); *G06F 2212/1028* (2013.01)

(58) Field of Classification Search
CPC .... G06F 3/0625; G06F 3/0634; G06F 3/0659; G06F 3/0679; G06F 12/0804; G06F 12/10; G06F 2212/1028; Y02D 10/00
See application file for complete search history.

(56) References Cited

U.S. PATENT DOCUMENTS

| | | | |
|---|---|---|---|
| 2008/0068238 A1* | 3/2008 | Bell | G06F 1/3243 341/139 |
| 2012/0173907 A1* | 7/2012 | Moses | G06F 12/0864 713/321 |
| 2019/0018713 A1* | 1/2019 | Foxworth | G06F 9/5094 |
| 2021/0018975 A1* | 1/2021 | Liang | G06F 3/0679 |
| 2022/0113907 A1* | 4/2022 | Kobayashi | G06F 3/0625 |

\* cited by examiner

*Primary Examiner* — Charles Rones
*Assistant Examiner* — Han V Doan
(74) *Attorney, Agent, or Firm* — Holland & Hart LLP

(57) ABSTRACT

Methods, systems, and devices for power management techniques are described. A memory system may receive a command to exit a first power mode and enter a second power mode. The first power mode may have a lower power consumption than the second power mode. The memory system may determine whether a duration of an idle period associated with the first power mode satisfies a threshold based on receiving the command to exit the first power mode. The memory system may receive another command associated with executing a flush operation and perform one or more power management operations based on receiving the command and determining that the duration satisfies the threshold.

20 Claims, 6 Drawing Sheets

POWER MANAGEMENT TECHNIQUES

FIELD OF TECHNOLOGY

The following relates generally to one or more systems for memory and more specifically to power management techniques.

BACKGROUND

Memory devices are widely used to store information in various electronic devices such as computers, user devices, wireless communication devices, cameras, digital displays, and the like. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

DETAILED DESCRIPTION

Figure 1:
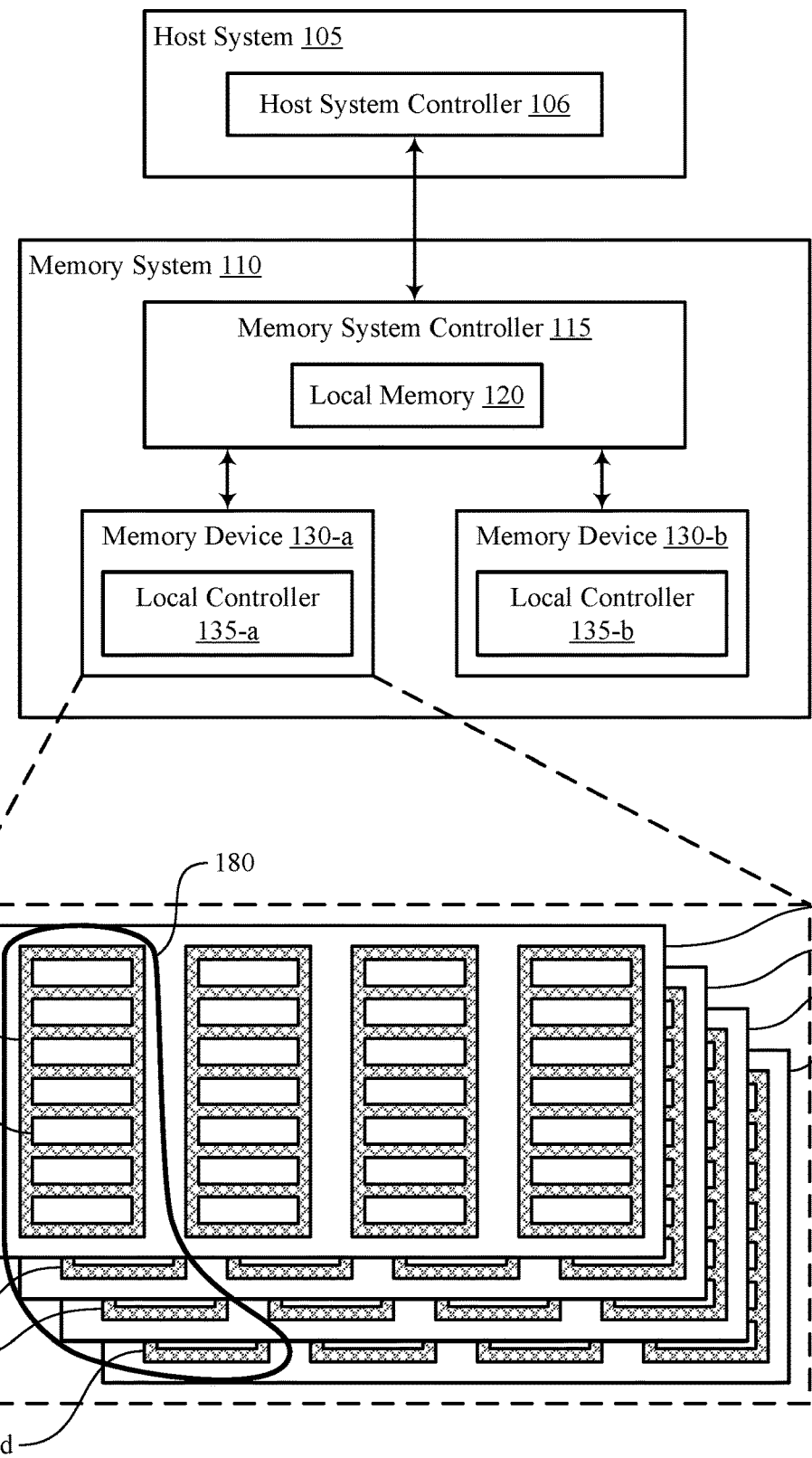
FIG. 1 illustrates an example of a system that supports power management techniques in accordance with examples as disclosed herein.

Some memory systems may have multiple power modes that are used in a variety of different scenarios. For example, a memory system may have a first power mode for performing access operations, a second power mode (such as a low power mode) to conserve power, and a third power mode (such as a hibernate mode) that occurs in response to the memory system being idle for a duration. In some cases, after being in a hibernate mode, the memory system may want to transition to a low power mode to conserve even more power. To transition from the hibernate mode to the low power mode, the memory system may transition to the active mode to perform one or more memory management operations that are part of entering the low power mode. For example, the memory system may enter the active mode to transfer information stored in caches (e.g., volatile memory devices) to non-volatile memory devices (e.g., NAND device). This sequence of power management operations that are performed before entering a low power mode may increase the latency for entering the low power mode after receiving the command to enter the low power mode. For example, a sequence to transition from the hibernate mode to the low power mode may include receiving a command to exit the hibernate mode, receiving a sync cache command, and finally receiving a command (e.g., start stop unit (SSU) command) that may cause the memory system to enter the lower power mode. Additionally, entering the active mode and performing the power management operation may consume power and may result in the memory system experiencing a performance loss, which may increase the latency for other operations related to the host system. The overall performance of the memory system may decrease, which may result in a host system experiencing impaired read, write, and erase speeds. Techniques for increasing efficiency of entering the low power mode and reducing the latency for entering the low power mode may be desired.

Techniques, systems, and devices are described herein for increasing performance and reducing latency by performing the sequence of power management operations prior to entering the low power mode. For example, the memory system may detect a pattern of commands, which, if detected, may be an indication that the memory system is going to transition from the hibernate mode to the low power mode (with an intervening transition to the active mode to perform the one or more power management operations). For example, the memory system may receive a command to exit a hibernate mode and determine whether a duration of the idle period during the hibernate mode satisfies a threshold after receiving the command. The memory system may then receive a command to perform a flush operation (e.g., a synchronization cache command). If the idle period was determined to satisfy the threshold, the memory system may predict that a final command to enter the low power mode may be coming. The memory system may perform one or more power management operations after determining that the duration of the idle period satisfies the threshold and the command to perform the flush operation is received. The power management operations may be performed after receiving the command to perform flush operation and prior to receiving the command to enter the low power mode. Such power management operations may usually be performed after receiving the command to enter the lower power mode. By performing the power management operations earlier in the process it may decrease the latency for the memory system to enter the low power mode after receiving the command to enter the lower power mode.

By using the power management technique, the memory system may reduce the latency of operations to enter the low power mode by causing some of the power management operations to be executed after receiving the synchronization cache command and before receiving the command to enter the low power mode. Using the power management technique may improve the overall efficiency of the memory system, which may result in the memory system experiencing improved read, write, and erase speeds, reduced power consumption, improved processing times, reduced wear on memory cells, and the like.

Features of the disclosure are initially described in the context of a system with reference to FIG. 1. Features of the disclosure are described in the context of timing and flow diagrams with reference to FIGS. 2-4. These and other features of the disclosure are further illustrated by and described in the context of an apparatus diagram and flowchart that relate to power management techniques with reference to FIGS. 5-6.

FIG. 1 illustrates an example of a system 100 that supports power management techniques in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices, and in some cases may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may in some cases be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may in some cases instead be performed by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165 c, and 165-d, respectively, and blocks 170-a, 170-b, 170-c, and 170-d may be collectively referred to as a virtual block 180. In some cases, a virtual block may include blocks 170 from different memory devices 130 (e.g., including blocks in one or more planes of memory device 130-a and memory device 130-b). In some cases, the blocks 170 within a virtual block may have the same block address within their respective planes 165 (e.g., block 170-a may be "block 0" of plane 165-a, block 170-b may be "block 0" of plane 165-b, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programmed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may in some cases not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete and may update a logical-to-physical (L2P) mapping table to associate the logical address (e.g., LBA) for the data with the new, valid block 170 rather than the old, invalid block 170. In some cases, such copying and remapping may be performed instead of erasing and rewriting the entire old block 170 due to latency or wearout considerations, for example. In some cases, one or more copies of an L2P mapping table may be stored within the memory cells of the memory device 130 (e.g., within one or more blocks 170 or planes 165) for use (e.g., reference and updating) by the local controller 135 or memory system controller 115.

In some cases, L2P mapping tables may be maintained and data may be marked as valid or invalid at the page level of granularity, and a page 175 may contain valid data, invalid data, or no data. Invalid data may be data that is outdated due to a more recent or updated version of the data being stored in a different page 175 of the memory device 130. Invalid data may have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has never been written to or that has been erased.

In some cases, a memory system controller 115 or a local controller 135 may perform operations (e.g., as part of one or more media management algorithms) for a memory device 130, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105).

The system 100 may include any quantity of non-transitory computer readable media that support power management techniques. For example, the host system 105, the memory system controller 115, or a memory device 130 may include or otherwise may access one or more non-transitory computer readable media storing instructions (e.g., firmware) for performing the functions ascribed herein to the host system 105, memory system controller 115, or memory device 130. For example, such instructions, if executed by the host system 105 (e.g., by the host system controller 106), by the memory system controller 115, or by a memory device 130 (e.g., by a local controller 135), may cause the host system 105, memory system controller 115, or memory device 130 to perform one or more associated functions as described herein.

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

In some examples, the memory system 110 may receive a command (e.g., first command) to exit a hibernate mode. The hibernate mode may be an example of first power mode. The memory system may determine whether a duration of an idle period satisfies a threshold. In some cases, the duration of the idle period may extend from receiving a command to enter the hibernate mode to receiving a command to exit the hibernate mode. In some cases, the duration of the idle period may extend from the command queue being empty to receiving a command to exit the hibernate mode. In some examples, the memory system may receive a synchronization (sync) cache command (e.g., second command) after determining whether the duration of the idle period satisfies the threshold.

If the duration of the idle period fails to satisfy the threshold (e.g., is below the threshold) and a sync cache command is received, the memory system may refrain from performing power management operations before receiving the command to enter the low power mode (e.g., SSU command). Instead, the memory system may perform the power management operations after receiving the SSU command. If the duration of the idle period satisfies the threshold (e.g., is equal to or above the threshold) and a sync cache command is received, the memory system may perform at least a portion of the power management operations before receiving the SSU command and after receiving the sync cache command. By performing a portion of the power management operations prior to receiving the SSU command, the memory system may reduce latency associated with executing the SSU command after receiving it and may increase the overall performance and efficiency of the memory system.

Figure 2:
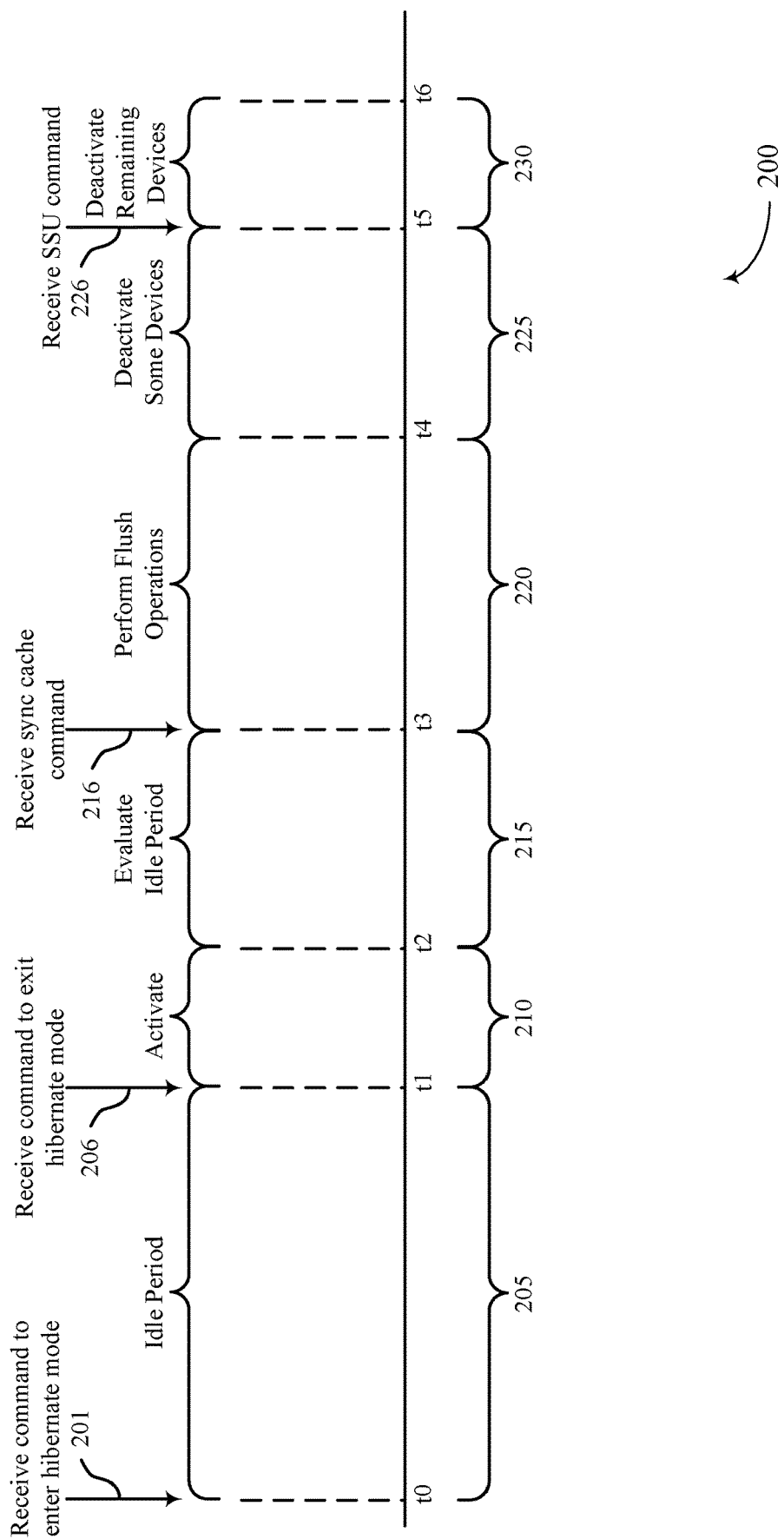
FIG. 2 illustrates an example of a timing diagram that supports power management techniques in accordance with examples as disclosed herein.

FIG. 2 illustrates an example of a timing diagram 200 that supports power management techniques in accordance with examples as disclosed herein. Timing diagram 200 may include an idle period during portion 205, an activation during portion 210, evaluating the idle period during portion 215, performing flush operations during portion 220, deactivating some devices during portion 225, and deactivating remaining devices during portion 230. Timing diagram 200 depicts a series and duration of events as a function of time, t.

In some cases, the memory system may experience a latency between receiving a command to enter low power mode and entering low power mode. The latency experienced during this duration may increase the power consumption of the memory system. Before entering a low power mode, the memory system may perform power management operations such as completing on-going housekeeping operations. These operations may take time to be completed. In some systems, the memory system may start the operations associated with entering the low power mode after the SSU command is received at the memory system. In such cases, performing the operations may delay the SSU command latency, thereby impacting the overall user experience and decreasing the overall efficiency of the memory system.

In such cases, techniques may be desired to reduce the power consumption and the latency associated with entering the low power mode. For example, the latency and power consumption used to transition from a hibernate mode to the low power mode (through an intervening active mode) may be reduced. The memory system may shorten the duration to the enter low power mode by predicting if the memory system may enter the low power mode after exiting a hibernate mode. For example, the memory system may determine (e.g. predict) that the next incoming command may be an SSU command. Based on the prediction, the memory system may start the operations associated with the SSU command before the SSU command is received at the memory system. By performing the power management operations prior to receiving the SSU command, the memory system may complete the operations before the SSU command arrives, thereby decreasing the duration between receiving the SSU command and entering the low power mode.

The memory system may determine a threshold associated with a duration of an idle period to determine whether the power management operations may be performed prior to receiving the SSU command. Determining the duration threshold may be an example of a training phase (not shown). The memory system may estimate the duration of the idle period between entering a hibernate mode and exiting the hibernate mode. To estimate the duration, a timer may be allocated each time the memory system receives a command to enter the hibernate mode (e.g., the memory system enters the hibernate mode). The memory system may receive a command to exit the hibernate mode after a duration of the idle period. The timer may be stopped and the value of the duration stored in a register of the memory system upon the detection of the exit hibernate command (i.e., the timer stops at receipt of the exit hibernate command). If the exit hibernate command is followed by a sync cache command and an SSU command following the sync cache command, then the value stored in the register is the threshold and identified as the target time for low power mode. In such cases, the duration of the idle period may be an example of an amount of time for the memory system to enter the low power mode.

In some examples, the host system may notify the memory system of the threshold (e.g., the value of the target time for low power mode). In such cases, the host system may indicate the duration of the idle period to the memory system. For example, the memory system may perform a write operation in a descriptor register based on receiving the threshold from the host system. Using this technique may enable the memory system to skip the training phase and determine the threshold with the assistance of the host system.

In some cases, a memory system integrated with an automotive system or other vehicular system may implement aspects of the timing diagram 200. However, rather than performing the power management operations based on the threshold determined from the training phase, the memory system may detect that a command buffer is empty for a duration (e.g., no pending commands to execute). In such cases, the host system may refrain from transmitting enter and exit hibernate commands. If the memory system determines that the duration of the idle period satisfies the threshold (e.g., the duration that the command buffer has been empty), the memory system may begin performing the power management operations. In such cases, the threshold determination may occur prior to receiving the sync cache command and the SSU command. In some examples, the hibernate commands may be absent from the memory system, and the memory system may evaluate the threshold if a sync cache command is received, which may increase battery management of the memory system.

After the memory system has identified the threshold, the memory system may implement the power management techniques. At time t0, an enter hibernate command 201 may be received. For example, the memory system may enter a hibernate mode (e.g., first power mode). The memory system may receive the enter hibernate command 201 from the host system. In hibernate mode, a portion of the memory devices of the memory system may be deactivated (e.g., shut off). For example, during the hibernate mode, the memory system may deactivate (e.g., turn off) a protocol layer which may turn off the communication lines between the host system and the memory system. The memory system may enter a power saving mode at time t0. For example, the first power mode may be an example of an idle mode, a power down mode, or both.

Portion 205 may extend from time t0 to time t1. During portion 205, a timer may be activated to determine a duration of the idle period (e.g., idle time). The duration of the idle period may span from time t0 to time t1 while the memory system is in the hibernate mode. For example, the idle period may be an example of a period that the memory system is in the hibernate mode. In some cases, the duration of the idle period may be an example of 3 seconds or 5 seconds. During portion 205, the memory system may execute little to no operations. In some cases, the memory system may execute some memory management operations (e.g., background operation initiated by the memory system) because the memory system is not occupied executing commands from the host system. The idle period may be an example of a duration of time that the command buffer is empty and there are no commands to be performed.

At time t1, an exit hibernate command 206 may be received. For example, the memory system may receive an exit hibernate command 206 transmitted by the host system. In such cases, the memory system may exit the hibernate mode upon receiving the exit hibernate command. The memory system may deactivate (e.g., stop) the timer associated with the duration of the idle period at time t1. In such cases, exiting the hibernate mode may notify, to the memory system, that the duration of the idle period is complete. At time t1, the memory system may turn on. For example, the memory system may enter an active mode (e.g., a second power mode) in response to exiting the hibernate mode. During portion 210, the memory system may power on. The portion 210 may span from time t1 to time t2 and include a duration of time that the memory system turns on (e.g., is activated). The second power mode may be an example of a higher-power mode that may consume more energy as compared to the hibernate mode. The second power mode may be associated with executing received commands.

At time t2, the idle period may be evaluated. For example, the memory system may evaluate whether the duration of the idle period during portion 215 from time t2 to time t3 satisfies a threshold. For example, the memory system may compare the duration of the idle period with the value stored in the register (e.g., the threshold). If the duration of the idle period is equal to or greater than the threshold, then the memory system may evaluate what steps are to be taken to enter the low power mode. If the duration of the idle period is less than the threshold, then the memory system may refrain from evaluating what steps are to be taken to enter the low power mode until the SSU command 226 is received.

At time t3, a sync cache command 216 may be received. The sync cache command 216 may be an example of a command to ensure that pending data in a volatile cache (e.g., SRAM) may be transferred to a non-volatile cache (e.g., NAND). In such cases, the host system may issue the sync cache command 216, and the memory system may execute the operations associated with the sync cache command after the command is received. In some examples, one more sync cache commands may be received at time t3.

The portion 220 may extend from time t3 to time t4. During portion 220, the memory system may start performing power management operations to prepare for entering a low power mode based on determining that the duration of the idle period satisfies the threshold and receiving the sync cache command. In some cases, the memory system may perform flush operations during portion 220. The flush operation may be an example of transferring data from caches and volatile storage to a non-volatile storage. For example, the memory system may transfer information stored in a volatile memory device of the memory system to a non-volatile memory device of the memory system during portion 220. In such cases, after the memory system exits the low power mode, the memory system may resume operations without re-initializing some or all of the operating parameters.

The memory system may verify that the contents of the volatile cache have been written to the NAND device and that the relevant information has been transferred successfully. In some cases, the volatile cache may be empty of data. The memory system may flush data contents, except for portions of L2P mappings, finish or halt on-going housekeeping operations, or a combination thereof to prepare to enter a low power mode. The memory system may transfer copies of various mappings (e.g., L2P mapping or physical validity (PVT) mapping) that are stored in the volatile caches to the non-volatile memory devices (e.g., NAND) during portion 220. In such cases, the memory system may predict that a command to enter the low power mode may be received. Based on that prediction, the memory system may begin the process of entering the low power mode after receiving the sync cache command. In such cases, the memory system may begin performing housekeeping operations during the duration of time that the memory system waits to receive the SSU command 226 to fully enter the low power mode.

In some systems, the memory system may start performing the one or more power management operations in response to receiving the SSU command 226 (e.g., a third command). By performing the one or more power management operations in response to receiving the sync cache command (e.g., prior to receiving the SSU command 226), the memory system may reduce a latency associated with entering the low power mode. The one or more power management operations may be an example of performing a flush operation associated with a cache of a memory system during portion 220, performing a flush operation associated with a table of the memory system during portion 220, or both.

In some cases, prior to entering the hibernate mode, the memory system may have performed flush operations. In such cases, the memory system may receive the sync cache command 216 and may refrain from turning off portions of the memory device and performing flush operations because the operations were already performed prior to receiving the sync cache command 216. The memory system may refrain from activating portions of the memory system during portion 210 in response to performing flush operations prior to entering the hibernate mode.

At time t4, memory device may be deactivated. For example, the memory system may begin deactivating a portion of the memory devices at time t4. In such cases, the memory system may continue to perform the power management operations during portion 225 prior to receiving the SSU command 226. Portion 225 may extend from time t4 to time t5. During portion 225, some components of the memory system may be deactivated (e.g., turned off). However, the memory system may keep the controller of the memory system activated (e.g., turned on). For example, the memory system may keep the portion of the memory system that receives the SSU command 226 activated.

During portion 225, the memory system may perform clock gating on at least some of the one or more components, deactivate a volatile memory device associated with the memory system, deactivate one or more components of the memory system, or a combination thereof. The memory system may deactivate the volatile memory device during portion 225 based on transferring the information during portion 220. For example, the memory system may turn off the SRAM. In some cases, the memory system may deactivate a first portion of one or more components associated with a memory system based on performing the one or more power management operations and save internal pointer tables to an internal storage.

At time t5, the SSU command 226 (e.g., third command) may be received. For example, the memory system may receive the SSU command 226 and enter the low power mode (e.g., third power mode). The host system may issue the SSU command 226 to notify the memory system to enter the low power mode. At time t5, the memory system may start entering low power mode by deactivating the remaining devices during portion 230. The low power mode may be an example of a sleep mode, a power off mode, or both. In such cases, the SSU command 226 may be an example of a sleep command, a low power mode command, a power off command, or a combination thereof. In such cases, the low power mode may consume less energy of the memory system than the hibernate mode and the active mode.

Portion 230 may extend from time t5 to time t6. In some examples, the memory system may turn off some or all remaining memory devices during portion 230, which may include the components that remained activated during portion 225. For example, the memory system may deactivate the controller configured to receive the SSU command 226. The low power mode may be an example of a sleep mode. For example, the low power mode may have a lower power consumption than the hibernate mode and the active mode.

Portion 230 may include a duration less than a duration if the memory system refrained from performing the power management operations until receiving the SSU command 226. By starting the power management operations at time t3 rather than time t5, the duration of portion 230 may be shortened. In such cases, the SSU command execution time may be shorter and duration between receiving the SSU command 226 and turning off the memory device may be lower. At time t6, the memory system may be turned off (e.g., in the low power mode). For example, the memory system may fully power down (e.g., enter the low power mode) at time t6.

The SSU command may be included in an SCSI command set. While FIG. 2 may be described in terms of the SSU command, the same function and command may be performed in other examples. In such cases, the memory system may receive other commands that may cause the memory system to enter the lower power mode. For example, in a memory system that includes an eMMC, the memory system may receive a PON SLEEP notification that may be an example of a command that may cause the memory system to enter the lower power mode.

Figure 3:
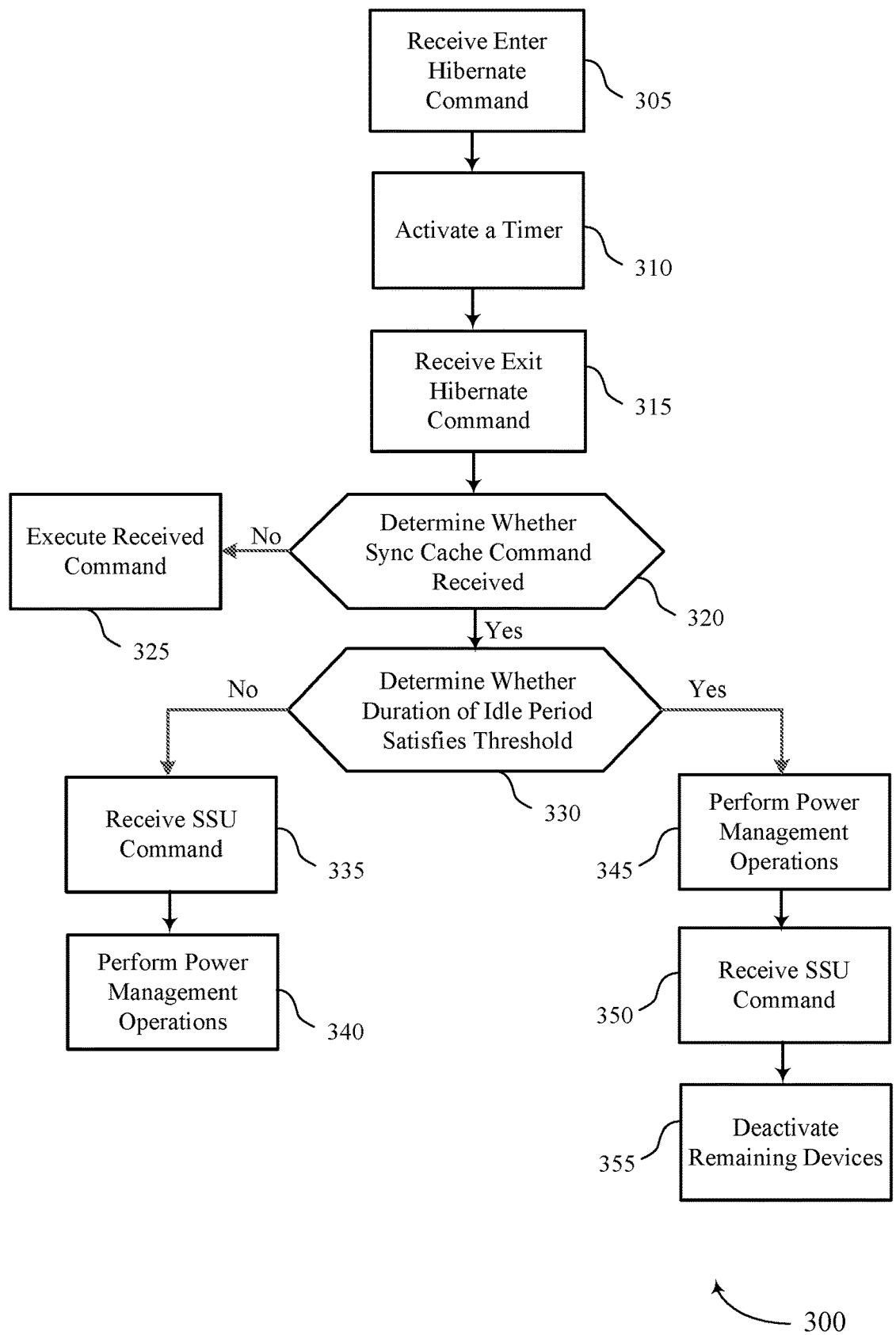
FIG. 3 illustrates an example of a flow diagram that supports power management techniques in accordance with examples as disclosed herein.

FIG. 3 illustrates an example of a flow diagram 300 that supports power management techniques in accordance with examples as disclosed herein. The operations of flow diagram 300 may be implemented by any device or its components as described herein. For example, the operations of flow diagram 300 may be performed by a memory system as described with reference to FIGS. 1-2. Alternative examples of the following may be implemented, where some steps are performed in a different order or not at all. Some steps may additionally include additional features not mentioned below. The flow diagram 300 illustrates techniques where a memory system may implement a power management techniques. The flow diagram 300 may represent similar operations as illustrated by timing diagram 200 as described with reference to FIG. 2.

Aspects of the flow diagram 300 may be implemented by a controller, among other components. Additionally or alternatively, aspects of the flow diagram 300 may be implemented as instructions stored in a controller (e.g., controller coupled with the memory system). For example, the instructions, if executed by a controller (e.g., the memory system controller 115), may cause the controller to perform the operations of the flow diagram 300.

At 305, an enter hibernate command may be received. For example, the memory system may receive a command (e.g., fourth command) to enter the hibernate mode (e.g., a first power mode). The host system may transmit the enter hibernate command, and the memory system may receive the enter hibernate command. In such cases, memory system may enter the hibernate mode in direct response to receiving the command.

At 310, a timer may be activated. For example, the memory system may activate a timer associated with an idle period in response to (or in direct response to) receiving the command. In some examples, the memory system may start a timer at a same time or after receiving the command to enter the hibernate mode. The timer may measure a duration of an idle period between entering the hibernate mode and exiting the hibernate mode.

At 315, an exit hibernate command may be received. For example, the memory system may receive a command (e.g., first command) to exit the hibernate mode. The command may include instructions to exit the hibernate mode and enter an active mode (e.g., a second power mode). In such cases, the hibernate mode may have a lower power consumption than the active mode. The host system may transmit the exit hibernate command, and the memory system may enter the active mode in response to receiving the command. In some examples, the memory system may deactivate the timer associated with the idle period in direct response to receiving the exit hibernate command. For example, the memory system may stop the timer after receiving the command to exit the hibernate mode.

At 320, a determination may be made whether a sync cache command is received. For example, the memory system may determine whether a sync cache command (e.g., a second command) may be received. The sync cache command may be associated with executing a flush operation. In some examples, the memory system may determine whether the host system transmits a sync cache command. In such cases, the memory system may determine whether the sync cache command is intended for the memory system prior to the memory system receiving the sync cache command. The memory system may determine whether the memory system receives the sync cache command in direct response to receiving the exit hibernate command. In other examples, the memory system may determine whether the memory system receives the sync cache command in direct response to determining that a duration of the idle period satisfies the threshold.

At 325, if the memory system determines that the sync cache command is not received, the command may be executed. The memory system may determine that a different command (other than the sync cache command) is received or intended for the memory system. For example, the memory system may receive a read command to retrieve data from the non-volatile memory device or may receive a write command to store data in the non-volatile memory device. In such cases, the memory system may determine that a command different than the sync cache command is received. The command may be an example of a read command, a write command, an erase command, or a combination thereof. The memory system may receive the command during the active mode. The memory system may execute the command in response to determining that that the sync cache command is not received at the memory system. In some cases, the memory system may skip (e.g., refrain from) performing power management operations and discard the power management operations in queue.

At 330, if the memory system determines that the sync cache command is received, a determination may be made whether a duration of an idle period associated with the hibernate mode satisfies a threshold. In some cases, the determination at 330 may be done after receiving the exit hibernate command (e.g., at 315) and before determining whether the memory system received the sync cache command (e.g., at 320). The memory system may determine whether the duration of the idle period satisfies the threshold in response to exiting the hibernate mode. In some cases, the memory may start evaluating the duration of the idle period after determining that the sync cache command may be intended for the memory system but before receiving the sync cache command. The threshold may be an example of a value stored in a register of the memory system. In some cases, the memory system may determine whether the duration satisfies the threshold based on activating and deactivating the timer and determining the duration of the idle period.

In some cases, the memory system may receive the sync cache command after determining whether the duration of the idle period satisfies the threshold. In other examples, the memory system may receive the sync cache command before determining whether the duration of the idle period satisfies the threshold. In some cases, the memory system may receive the sync cache command during the active mode.

In other examples, the memory system may determine that the duration of the idle period fails to satisfy the threshold. In such cases, at 335, an SSU command may be received. For example, the memory system may receive a command to enter a low power mode in response to determining that the duration of the idle period fails to satisfy the threshold. The low power mode may have a lower power consumption than the hibernate mode and the active mode. In some cases, the memory system may receive the SSU command after receiving the sync cache command.

At 340, one or more power management operations may be performed. For example, the memory system may perform one or more power management operations in response to receiving the SSU command. In such cases, the memory system may deactivate a first portion of one or more components associated with the memory system and deactivate a second portion of the one or more components in response to receiving the SSU command. For example, the memory system may turn off some or all components associated with the memory system after receiving the SSU command. In some examples, and in response to receiving the SSU command, the memory system may perform a flush operation associated with a cache of a memory system, perform a flush operation associated with a table of the memory system, perform clock gating on at least some of the one or more components, deactivate a volatile memory device (e.g., SRAM) associated with the memory system, deactivate one or more components of the memory system, or a combination thereof. The memory system may turn off (e.g., deactivate) the SRAM after transferring information stored in the SRAM to a non-volatile memory device (e.g., NAND) of the memory system. The information may include a mapping between logical address included in commands and physical addresses associated with the NAND.

In other examples, the memory system may determine that the duration of the idle period satisfies the threshold. In such cases, at 345, one or more power management operations may be performed before the SSU command is received. For example, the memory system may perform one or more power management operations in direct response to determining that the duration of the idle period satisfies the threshold and receiving the sync cache command.

The memory system may deactivate a first portion of one or more components associated with the memory system. For example, the memory system may turn off some components and leave the remaining component on before receiving the SSU command. The remaining components may be an example of devices configured to receive the SSU command, among other components. In response to determining that the duration of the idle period satisfies the threshold and receiving the sync cache command, the memory system may perform a flush operation associated with a cache of the memory system, perform a flush operation associated with a table of the memory system, perform clock gating on at least some of the one or more components, deactivate a volatile memory device associated with the memory system, deactivate one or more components of the memory system, or a combination thereof. The memory system may transfer information stored in the SRAM of the memory system to the NAND of the memory system and deactivate the SRAM based at least in part on transferring the information. The transferred information includes a mapping between logical address included in commands and physical addresses associated with the non-volatile memory device.

At 350, an SSU command may be received. For example, the memory system may receive a command (e.g., a third command) to enter a low power mode (e.g., a third power mode). The memory system may receive the SSU command after or in response to performing the one or more power management operations. For example, the memory system may receive the SSU command in response to deactivating the first portion of the one or more components.

At 355, the remaining memory devices of the memory system may be deactivated (e.g., turned off). For example, the memory system may deactivate a second portion of the one or more components in response to receiving the SSU command. In such cases, the memory system may turn off the remaining devices after receiving the SSU command. The memory system may enter the low power mode in response to deactivating the second portion.

The SSU command may be included in an SCSI command set. While FIG. 3 may be described in terms of the SSU command, the same function and command may be performed in other examples. In such cases, the memory system may receive other commands that may cause the memory system to enter the lower power mode. For example, in a memory system that includes an eMMC, the memory system may receive a PON SLEEP notification that may be an example of a command that may cause the memory system to enter the lower power mode.

Figure 4:
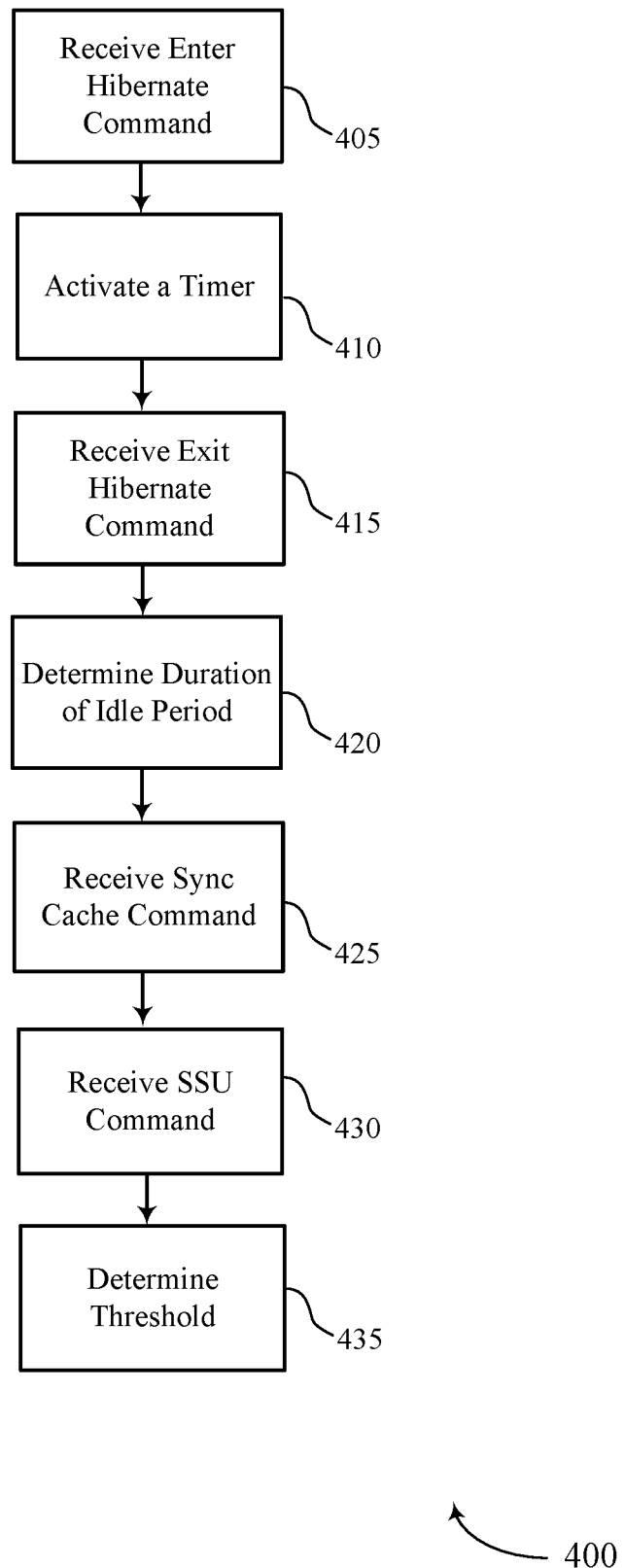
FIG. 4 illustrates an example of a flow diagram that supports power management techniques in accordance with examples as disclosed herein.

FIG. 4 illustrates an example of a flow diagram 400 that supports power management techniques in accordance with examples as disclosed herein. The operations of flow diagram 400 may be implemented by any device or its components as described herein. For example, the operations of flow diagram 400 may be performed by a memory system as described with reference to FIGS. 1-3. Alternative examples of the following may be implemented, where some steps are performed in a different order or not at all. Some steps may additionally include additional features not mentioned below. The flow diagram 400 may illustrate techniques where a memory system may determine a threshold to utilize for the power management techniques. In some cases, the flow diagram 400 may be an example of the training phase as described with reference to FIG. 2.

Aspects of the flow diagram 400 may be implemented by a controller, among other components. Additionally or alternatively, aspects of the flow diagram 400 may be implemented as instructions stored in a controller (e.g., controller coupled with the memory system). For example, the instructions, if executed by a controller (e.g., the memory system controller 115), may cause the controller to perform the operations of the flow diagram 400.

At 405, an enter hibernate command may be received. For example, the memory system may receive a command (e.g., fourth command) to enter the hibernate mode (e.g., a first power mode). The host system may transmit the enter hibernate command. In such cases, the memory system may receive the command and enter the hibernate mode in direct response to receiving the command.

At 410, a timer may be activated. For example, the memory system may activate a timer associated with an idle period in direct response to receiving the command. In some examples, the memory system may start a timer at a same time or after receiving the command to enter the hibernate mode. The timer may measure a duration of an idle period. The idle period may be a duration between entering the hibernate mode and exiting the hibernate mode.

At 415, an exit hibernate command may be received. For example, the memory system may receive a command (e.g., first command) to exit the hibernate mode. The command may include instructions to exit the hibernate mode and enter an active mode (e.g., a second power mode). In such cases, the hibernate mode may have a lower power consumption than the active mode. The host system may transmit the exit hibernate command, and the memory system may then enter the active mode in response to receiving the command. In some examples, the memory system may deactivate the timer associated with the idle period in direct response to receiving the exit hibernate command. For example, the memory system may stop the timer after receiving the command to exit the hibernate mode.

At 420, a duration of the idle period may be determined. For example, the memory system may determine the duration of the idle period in response to receiving the exit hibernate command. For example, the memory system may determine the duration of the idle period and store the value in a register. In such cases, the memory system may store, in the register, the value of the duration of the idle period in direct response to determining the duration of the idle period. The memory system may determine the duration of the idle period and store the value after deactivating the timer.

At 425, a sync cache command may be received. For example, the memory system may receive a command (e.g., a second command) associated with executing a flush operation. The host system may transmit the sync cache command, and the memory system may receive the sync cache command after determining the duration of the idle period. In some cases, the memory system may receive the sync cache command during the active mode.

At 430, an SSU command may be received. For example, the memory system may receive a command (e.g., a third command) to enter a low power mode (e.g., a third power mode). The low power mode may have a lower power consumption than the hibernate mode and the active mode. The memory system may receive the SSU command after or in response to receiving the sync cache command.

At 435, a threshold may be determined. For example, the memory system may determine that the value stored in the register satisfies the threshold in response to receiving the sync cache command and receiving the SSU command. In such cases, the memory system may determine that the value stored in the register is the threshold based on receiving the sync cache command and receiving the SSU command after exiting the hibernate mode. The memory system may identify the value stored as the target time for low power mode. The determined threshold at 435 may be the threshold utilized by the memory system at 330 of FIG. 3.

The SSU command may be included in an SCSI command set. While FIG. 4 may be described in terms of the SSU command, the same function and command may be performed in other examples. In such cases, the memory system may receive other commands that may cause the memory system to enter the lower power mode. For example, in a memory system that includes an eMMC, the memory system may receive a PON SLEEP notification that may be an example of a command that may cause the memory system to enter the lower power mode.

Figure 5:
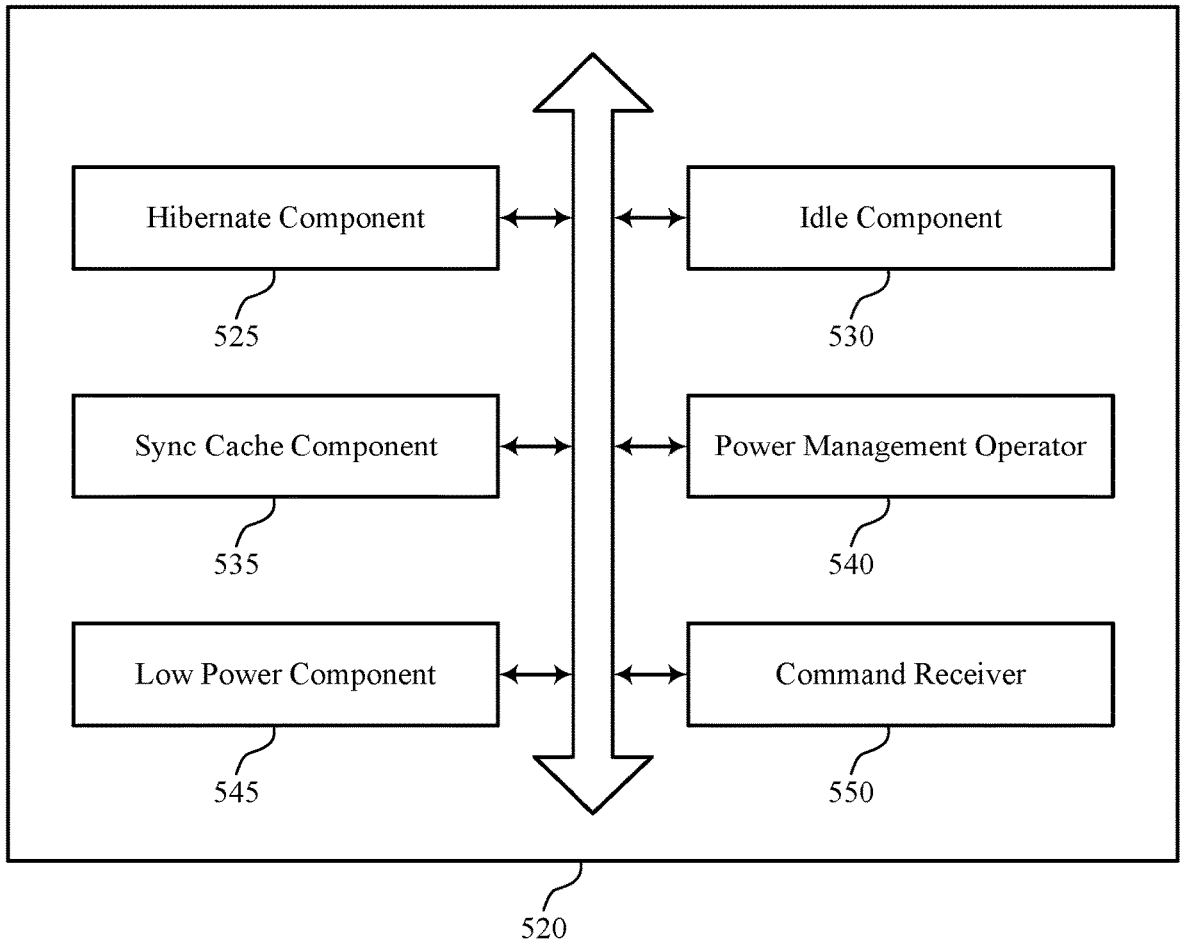
FIG. 5 shows a block diagram of a memory system that supports power management techniques in accordance with examples as disclosed herein.

FIG. 5 shows a block diagram 500 of a memory system 520 that supports power management techniques in accordance with examples as disclosed herein. The memory system 520 may be an example of aspects of a memory system as described with reference to FIGS. 1 through 3. The memory system 520, or various components thereof, may be an example of means for performing various aspects of power management techniques as described herein. For example, the memory system 520 may include a hibernate component 525, an idle component 530, a sync cache component 535, a power management operator 540, a low power component 545, a command receiver 550, or any combination thereof. Each of these components may communicate, directly or indirectly, with one another (e.g., via one or more buses).

The hibernate component 525 may be configured as or otherwise support a means for receiving a first command to exit a first power mode and enter a second power mode, the first power mode having a lower power consumption than the second power mode. The idle component 530 may be configured as or otherwise support a means for determining whether a duration of an idle period associated with the first power mode satisfies a threshold based at least in part on exiting the first power mode. The sync cache component 535 may be configured as or otherwise support a means for receiving a second command associated with executing a flush operation. The power management operator 540 may be configured as or otherwise support a means for performing one or more power management operations based at least in part on receiving the second command and determining that the duration satisfies the threshold.

In some examples, the low power component 545 may be configured as or otherwise support a means for receiving a third command to enter a third power mode having a lower power consumption than the first power mode after performing at least portions of the one or more power management operations.

In some examples, the power management operator 540 may be configured as or otherwise support a means for deactivating a first portion of one or more components associated with a memory system based at least in part on performing the one or more power management operations, where receiving the third command is based at least in part on deactivating the first portion of the one or more components. In some examples, the power management operator 540 may be configured as or otherwise support a means for deactivating a second portion of the one or more components based at least in part on receiving the third command.

In some examples, the hibernate component 525 may be configured as or otherwise support a means for receiving a fourth command to enter the first power mode. In some examples, the idle component 530 may be configured as or otherwise support a means for activating a timer associated with the idle period based at least in part on receiving the fourth command, where determining whether the duration satisfies the threshold is based at least in part on activating the timer.

In some examples, the idle component 530 may be configured as or otherwise support a means for deactivating the timer associated with the idle period based at least in part on receiving the first command, where determining whether the duration satisfies the threshold is based at least in part on deactivating the timer.

In some examples, the idle component 530 may be configured as or otherwise support a means for determining the duration of the idle period based at least in part on receiving the first command. In some examples, the idle component 530 may be configured as or otherwise support a means for storing, in a register, a value of the duration of the idle period based at least in part on determining the duration of the idle period, where determining whether the duration satisfies the threshold is based at least in part on storing the value.

In some examples, the low power component 545 may be configured as or otherwise support a means for receiving a third command to enter a third power mode having a lower power consumption than the first power mode based at least in part on receiving the second command. In some examples, the idle component 530 may be configured as or otherwise support a means for determining that the value stored in the register satisfies the threshold based at least in part on receiving the second command and receiving the third command, where determining whether the duration satisfies the threshold is based at least in part on determining that the value stored in the register satisfies the threshold.

In some examples, the power management operator 540 may be configured as or otherwise support a means for performing a flush operation associated with a cache of a memory system, performing a flush operation associated with a table of the memory system, performing clock gating on one or more components, deactivating a volatile memory device associated with the memory system, deactivating one or more components of the memory system, or a combination thereof.

In some examples, the power management operator 540 may be configured as or otherwise support a means for transferring information stored in a volatile memory device of the memory system to a non-volatile memory device of the memory system. In some examples, the power management operator 540 may be configured as or otherwise support a means for deactivating the volatile memory device based at least in part on transferring the information.

In some examples, the volatile memory device includes a static random access memory of the memory system. In some examples, the non-volatile memory device includes a NAND memory of the memory system. In some examples, the information includes a mapping between logical address included in commands and physical addresses associated with the non-volatile memory device.

In some examples, the first command includes an exit hibernate command. In some examples, the second command includes a sync cache command.

Figure 6:
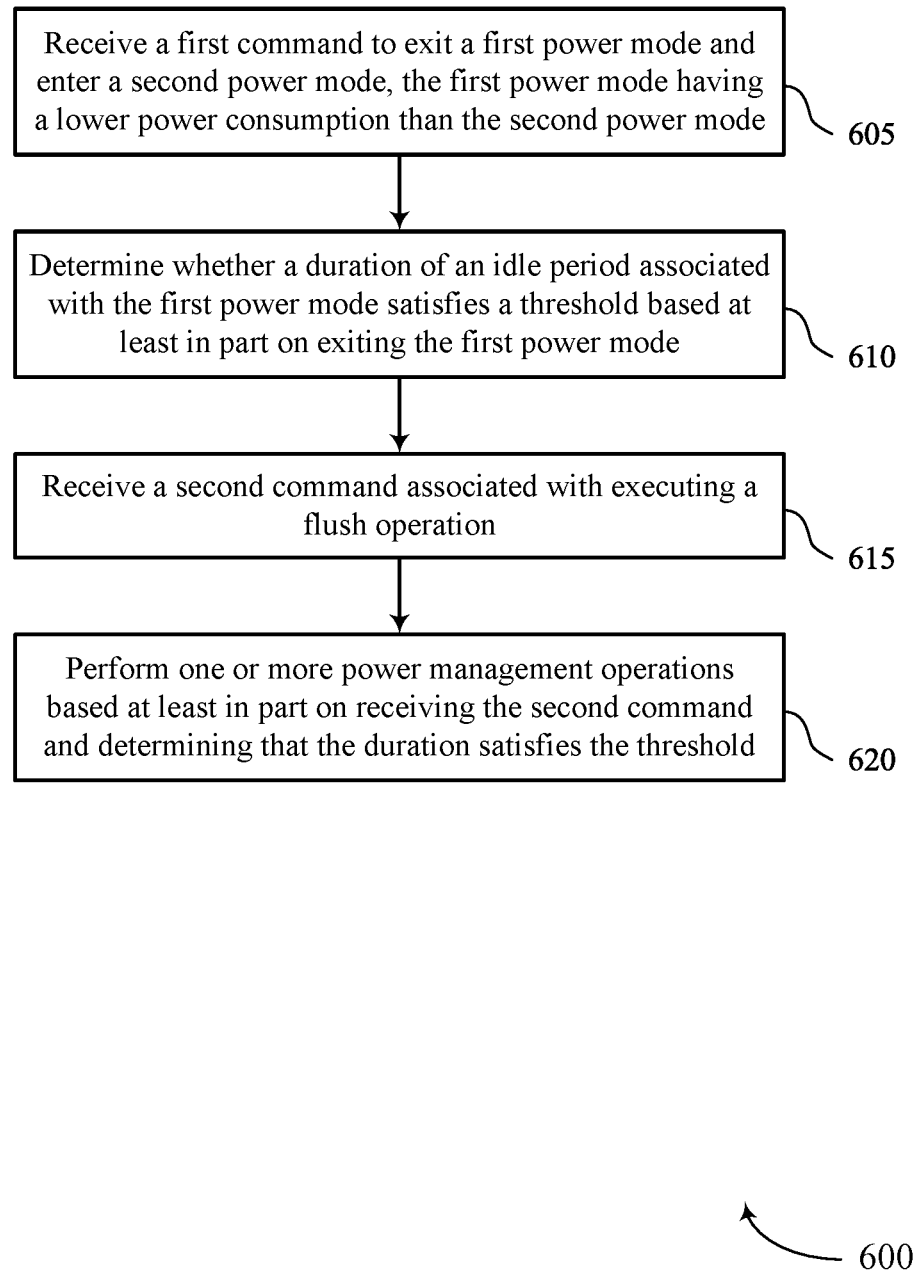
FIG. 6 shows a flowchart illustrating a method or methods that support power management techniques in accordance with examples as disclosed herein.

FIG. 6 shows a flowchart illustrating a method 600 that supports power management techniques in accordance with examples as disclosed herein. The operations of method 600 may be implemented by a memory system or its components as described herein. For example, the operations of method 600 may be performed by a memory system as described with reference to FIGS. 1 through 5. In some examples, a memory system may execute a set of instructions to control the functional elements of the device to perform the described functions. Additionally or alternatively, the memory system may perform aspects of the described functions using special-purpose hardware.

At 605, a first command may be received. For example, the method may include receiving a first command to exit a first power mode and enter a second power mode, the first power mode having a lower power consumption than the second power mode. The operations of 605 may be performed in accordance with examples as disclosed herein. In some examples, aspects of the operations of 605 may be performed by a hibernate component 525 as described with reference to FIG. 5.

At 610, a duration of an idle period may be determined. For example, the method may include determining whether a duration of an idle period associated with the first power mode satisfies a threshold based at least in part on exiting the first power mode. The operations of 610 may be performed in accordance with examples as disclosed herein. In some examples, aspects of the operations of 610 may be performed by an idle component 530 as described with reference to FIG. 5.

At 615, a second command may be received. For example, the method may include receiving a second command associated with executing a flush operation. The operations of 615 may be performed in accordance with examples as disclosed herein. In some examples, aspects of the operations of 615 may be performed by a sync cache component 535 as described with reference to FIG. 5.

At 620, one or more power management operations may be performed. For example, the method may include performing one or more power management operations based at least in part on receiving the second command and determining that the duration satisfies the threshold. The operations of 620 may be performed in accordance with examples as disclosed herein. In some examples, aspects of the operations of 620 may be performed by a power management operator 540 as described with reference to FIG. 5.

In some examples, an apparatus as described herein may perform a method or methods, such as the method 600. The apparatus may include, features, circuitry, logic, means, or instructions (e.g., a non-transitory computer-readable medium storing instructions executable by a processor) for receiving a first command to exit a first power mode and enter a second power mode, the first power mode having a lower power consumption than the second power mode, determining whether a duration of an idle period associated with the first power mode satisfies a threshold based at least in part on exiting the first power mode, receiving a second command associated with executing a flush operation, and performing one or more power management operations based at least in part on receiving the second command and determining that the duration satisfies the threshold.

Some examples of the method 600 and the apparatus described herein may further include operations, features, circuitry, logic, means, or instructions for receiving a third command to enter a third power mode having a lower power consumption than the first power mode after performing at least portions of the one or more power management operations.

Some examples of the method 600 and the apparatus described herein may further include operations, features, circuitry, logic, means, or instructions for deactivating a first portion of one or more components associated with a memory system based at least in part on performing the one or more power management operations, where receiving the third command may be based at least in part on deactivating the first portion of the one or more components and deactivating a second portion of the one or more components based at least in part on receiving the third command.

Some examples of the method 600 and the apparatus described herein may further include operations, features, circuitry, logic, means, or instructions for receiving a fourth command to enter the first power mode and activating a timer associated with the idle period based at least in part on receiving the fourth command, where determining whether the duration satisfies the threshold may be based at least in part on activating the timer.

Some examples of the method 600 and the apparatus described herein may further include operations, features, circuitry, logic, means, or instructions for deactivating the timer associated with the idle period based at least in part on receiving the first command, where determining whether the duration satisfies the threshold may be based at least in part on deactivating the timer.

Some examples of the method 600 and the apparatus described herein may further include operations, features, circuitry, logic, means, or instructions for determining the duration of the idle period based at least in part on receiving the first command and storing, in a register, a value of the duration of the idle period based at least in part on determining the duration of the idle period, where determining whether the duration satisfies the threshold may be based at least in part on storing the value.

Some examples of the method 600 and the apparatus described herein may further include operations, features, circuitry, logic, means, or instructions for receiving a third command to enter a third power mode having a lower power consumption than the first power mode based at least in part on receiving the second command and determining that the value stored in the register satisfies the threshold based at least in part on receiving the second command and receiving the third command, where determining whether the duration satisfies the threshold may be based at least in part on determining that the value stored in the register satisfies the threshold.

Some examples of the method 600 and the apparatus described herein may further include operations, features, circuitry, logic, means, or instructions for performing a flush operation associated with a cache of a memory system, performing a flush operation associated with a table of the memory system, performing clock gating on one or more components, deactivating a volatile memory device associated with the memory system, deactivating one or more components of the memory system, or a combination thereof.

Some examples of the method 600 and the apparatus described herein may further include operations, features, circuitry, logic, means, or instructions for transferring information stored in a volatile memory device of the memory system to a non-volatile memory device of the memory system and deactivating the volatile memory device based at least in part on transferring the information.

In some examples of the method 600 and the apparatus described herein, the volatile memory device includes a static random access memory of the memory system, the non-volatile memory device includes a NAND memory of the memory system, and the information includes a mapping between logical address included in commands and physical addresses associated with the non-volatile memory device.

In some examples of the method 600 and the apparatus described herein, the first command includes an exit hibernate command and the second command includes a sync cache command.

It should be noted that the methods described above describe possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if" "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action.

In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally or alternatively (e.g., in an alternative example) be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A memory system, comprising:
   one or more memory devices; and
   one or more controllers coupled with the one or more memory devices and configured to cause the memory system to:
   receive a first command to exit a hibernation mode and enter an active mode, the hibernation mode having a lower power consumption than the active mode;
   receive a second command to perform a flush operation;
   determine, based at least in part on exiting the hibernation mode and based at least in part on receiving the second command to perform the flush operation, whether a duration of an idle period between entering the hibernation mode and exiting the hibernation mode satisfies a threshold;
   perform the flush operation associated with a cache of the memory system based at least in part on receiving the second command;
   perform, after performing the flush operation and before receiving a third command to enter a sleep mode having a lower power consumption than the hibernation mode, one or more power management operations associated with entering the sleep mode based at least in part on the second command being a command to perform the flush operation and based at least in part on the duration of the idle period satisfying the threshold; and
   receive the third command to enter the sleep mode after performing the one or more power management operations associated with entering the sleep mode.

2. The memory system of claim 1, wherein the one or more controllers is further configured to cause the memory system to:
   deactivate a first portion of one or more components associated with the memory system based at least in part on performing the one or more power management operations, wherein receiving the third command is based at least in part on deactivating the first portion of the one or more components; and
   deactivate a second portion of the one or more components based at least in part on receiving the third command.

3. The memory system of claim 1, wherein the one or more controllers is further configured to cause the memory system to:
   receive a fourth command to enter the hibernation mode; and
   activate a timer associated with the idle period based at least in part on receiving the fourth command, wherein determining whether the duration satisfies the threshold is based at least in part on activating the timer.

4. The memory system of claim 3, wherein the one or more controllers is further configured to cause the memory system to:
   deactivate the timer associated with the idle period based at least in part on receiving the first command, wherein determining whether the duration satisfies the threshold is based at least in part on deactivating the timer.

5. The memory system of claim 1, wherein the one or more controllers is further configured to cause the memory system to:
   determine the duration of the idle period based at least in part on receiving the first command; and
   store, in a register, a value of the duration of the idle period based at least in part on determining the duration of the idle period, wherein determining whether the duration satisfies the threshold is based at least in part on storing the value.

6. The memory system of claim 1, wherein, to perform the one or more power management operations, the one or more controllers is configured to cause the memory system to:
   perform clock gating on one or more components, deactivate a volatile memory device associated with the memory system, deactivate one or more components of the memory system, or a combination thereof.

7. The memory system of claim 1, wherein, to perform the flush operation, the one or more controllers is configured to cause the memory system to:
   transfer information stored in a volatile memory device of the memory system to a non-volatile memory device of the memory system; and
   deactivate the volatile memory device based at least in part on transferring the information.

8. The memory system of claim 7, wherein:
   the volatile memory device comprises a static random access memory of the memory system;
   the non-volatile memory device comprises a NAND memory of the memory system; and
   the information comprises a mapping between logical address included in commands and physical addresses associated with the non-volatile memory device.

9. The memory system of claim 1, wherein:
   the first command comprises an exit hibernate command; and
   the second command comprises a sync cache command.

10. A non-transitory computer-readable medium storing code comprising instructions that, when executed by processing circuitry of an electronic device, cause the electronic device to:
    receive a first command to exit a hibernation mode and enter an active mode, the hibernation mode having a lower power consumption than the active mode;
    receive a second command to perform a flush operation;
    determine, based at least in part on exiting the hibernation mode and based at least in part on receiving the second command, whether a duration of an idle period between entering the hibernation mode and exiting the hibernation mode satisfies a threshold;

perform the flush operation associated with a cache of the electronic device based at least in part on receiving the second command;

perform, after performing the flush operation and before receiving a third command to enter a sleep mode having a lower power consumption than the hibernation mode, one or more power management operations associated with entering the sleep mode based at least in part on the second command being a command to perform the flush operation and based at least in part on the duration of the idle period satisfying the threshold; and receive the third command to enter the sleep mode after performing the one or more power management operations associated with entering the sleep mode.

11. The non-transitory computer-readable medium of claim 10, wherein the instructions, when executed by the processing circuitry of the electronic device, further cause the electronic device to:

deactivate a first portion of one or more components associated with a memory system based at least in part on performing the one or more power management operations, wherein receiving the third command is based at least in part on deactivating the first portion of the one or more components; and deactivate a second portion of the one or more components based at least in part on receiving the third command.

12. The non-transitory computer-readable medium of claim 10, wherein the instructions, when executed by the processing circuitry of the electronic device, further cause the electronic device to:

receive a fourth command to enter the hibernation mode; and activate a timer associated with the idle period based at least in part on receiving the fourth command, wherein determining whether the duration satisfies the threshold is based at least in part on activating the timer.

13. The non-transitory computer-readable medium of claim 12, wherein the instructions, when executed by the processing circuitry of the electronic device, further cause the electronic device to:

deactivate the timer associated with the idle period based at least in part on receiving the first command, wherein determining whether the duration satisfies the threshold is based at least in part on deactivating the timer.

14. The non-transitory computer-readable medium of claim 10, wherein the instructions, when executed by the processing circuitry of the electronic device, further cause the electronic device to:

determine the duration of the idle period based at least in part on receiving the first command; and store, in a register, a value of the duration of the idle period based at least in part on determining the duration of the idle period, wherein determining whether the duration satisfies the threshold is based at least in part on storing the value.

15. The non-transitory computer-readable medium of claim 10, wherein the instructions to perform the one or more power management operations, when executed by the processing circuitry of the electronic device, cause the electronic device to:

perform clock gating on one or more components, deactivate a volatile memory device associated with the electronic device, deactivate one or more components of the electronic device, or a combination thereof.

16. The non-transitory computer-readable medium of claim 10, wherein the instructions to perform the flush operation, when executed by the processing circuitry of the electronic device, cause the electronic device to:

transfer information stored in a volatile memory device of a memory system to a non-volatile memory device of the memory system; and deactivate the volatile memory device based at least in part on transferring the information.

17. The non-transitory computer-readable medium of claim 16, wherein:

the volatile memory device comprises a static random access memory of the memory system;

the non-volatile memory device comprises a NAND memory of the memory system; and the information comprises a mapping between logical address included in commands and physical addresses associated with the non-volatile memory device.

18. The non-transitory computer-readable medium of claim 10, wherein:

the first command comprises an exit hibernate command; and the second command comprises a sync cache command.

19. A method, comprising:

receiving a first command to exit a hibernation mode and enter an active mode, the hibernation mode having a lower power consumption than the active mode;

receiving a second command to perform a flush operation;

determining, based at least in part on exiting the hibernation mode and based at least in part on receiving the second command, whether a duration of an idle period between entering the hibernation mode and exiting the hibernation mode satisfies a threshold;

performing the flush operation associated with a cache of a memory system based at least in part on receiving the second command;

performing, after performing the flush operation and before receiving a third command to enter a sleep mode having a lower power consumption than the hibernation mode, one or more power management operations associated with entering the sleep mode based at least in part on the second command being a command to perform the flush operation and based at least in part on the duration of the idle period satisfying the threshold; and receiving the third command to enter the sleep mode after performing the one or more power management operations associated with entering the sleep mode.

20. The method of claim 19, further comprising:

deactivating a first portion of one or more components associated with the memory system based at least in part on performing the one or more power management operations, wherein receiving the third command is based at least in part on deactivating the first portion of the one or more components; and deactivating a second portion of the one or more components based at least in part on receiving the third command.

* * * * *